(12) United States Patent
Kelly (10) Patent No.: US 7,571,049 B2
(45) Date of Patent: Aug. 4, 2009

(54) TIMING DEVICE, SYSTEM AND METHOD FOR ESTIMATED TIME OF ARRIVAL (ETA)

(75) Inventor: Edward A. Kelly, San Carlos, CA (US)

(73) Assignee: Edward Andrew Kelly, San Carlos, CA (US)

( * ) Notice: Subject to any disclaimer, the term of this patent is extended or adjusted under 35 U.S.C. 154(b) by 498 days.

(21) Appl. No.: 11/101,864

(22) Filed: Apr. 7, 2005

(65) Prior Publication Data

US 2005/0288852 A1    Dec. 29, 2005

Related U.S. Application Data (60) Provisional application No. 60/560,565, filed on Apr. 7, 2004.

(51) Int. Cl.
  *G04G 5/00* (2006.01)
  *G01C 21/10* (2006.01)
  *G04F 10/00* (2006.01)
  *G01C 21/00* (2006.01)

(52) U.S. Cl. .................. 701/204; 368/111; 702/176

(58) Field of Classification Search ............. 340/994; 701/204; 482/3, 8, 1, 7, 9; 368/14, 108, 368/111; 702/176, 187, 149, 178
  See application file for complete search history.

(56) References Cited

U.S. PATENT DOCUMENTS

| | | | |
|---|---|---|---|
| 3,443,073 A * | 5/1969 | Cohen | 701/204 |
| 3,598,306 A | 8/1971 | Osborne | |
| 4,853,682 A | 8/1989 | Asano et al. | |
| 5,301,154 A | 4/1994 | Suga | |
| 5,404,341 A | 4/1995 | Horiguchi | |
| 5,408,446 A | 4/1995 | Ohira | |
| 5,476,427 A | 12/1995 | Fujima | |
| 6,013,007 A * | 1/2000 | Root et al. | 482/8 |
| 6,837,827 B1 * | 1/2005 | Lee et al. | 482/8 |
| 6,853,955 B1 * | 2/2005 | Burrell et al. | 702/182 |
| 6,898,550 B1 * | 5/2005 | Blackadar et al. | 702/182 |
| 6,909,671 B2 * | 6/2005 | Setler | 368/113 |
| 6,917,565 B2 * | 7/2005 | Kishida | 368/2 |
| 6,970,784 B2 * | 11/2005 | Shinagawa | 701/204 |
| 7,254,516 B2 * | 8/2007 | Case et al. | 702/182 |
| 2003/0216885 A1 * | 11/2003 | Tanifuji | 702/149 |

* cited by examiner

*Primary Examiner*—Thomas G Black
*Assistant Examiner*—Christine M Behncke (57) ABSTRACT

A timing device monitors an estimated time of arrival (ETA) for an object in a process of traversing a predetermined range of distance by computing the estimated time of arrival based on a time the object has spent completing at least one interval during the course of traversing the distance. The computation is invoked each time a signal is received by the timing device indicating the completion of an interval. The signal can be sent by a user of the device of by a transmitter placed near an end of the interval.

14 Claims, 8 Drawing Sheets

FIG. 1

| | |
|---|---|
| General Control Program — 200 | |
| ETA Program — 202 | |
| Time-keeping — 206 | |
| Stop Watch — 208 | |
| Total Distance — 210 | |
| Number of Intervals — 212 | |
| Target Goal Time — 214 | |
| Start Time — 216 | |
| Number of last finished interval — 218 | |
| Time associated with Interval 1 — 220-1 | |
| Time associated with Interval 2 — 220-2 | |
| ... | |
| Time associated with Last Finished Interval — 220-(n-1) | |
| Time elapsed in Current Interval — 220-n | |
| ... | |
| Interval N — 220-N | |
| Total time to complete the prior intervals — 222 | |
| Total time to complete a number of m prior intervals — 224 | |
| Average speed — 226 | |
| ETA — 230 | |
| Difference between ETA and Target — 232 | |

FIG. 8

TIMING DEVICE, SYSTEM AND METHOD FOR ESTIMATED TIME OF ARRIVAL (ETA)

CROSS REFERENCE TO RELATED APPLICATIONS

The present application claims priority 35 U.S.C. 119 and/or 35 U.S.C. 120 to U.S. Provisional Patent Application No. 60/560,565 filed on Apr. 7, 2004, naming Edward A. Kelly as inventor and entitled "Estimated time of arrival (ETA) timing computer chip and device," the entire disclosure of which is incorporated herein by reference.

BACKGROUND

Many watches and other timing devices have incorporated other features in addition to a time-keeping function. An example is a running watch, which can tell the runner, at any point in time, the total time of the run and also the time the runner has spent in completing the last interval, which can be a section in a range of distance that the runner is to cover.

U.S. Pat. No. 5,476,427 describes a pace display device that calculates the average and actual pace to cover a specified distance based on a number of steps per unit time. It calculates the difference between the actual and average (based on prior tests) and displays the difference to inform the individual of their performance relative to the average pace.

U.S. Pat. No. 5,301,154 describes a time calculating device that calculates a time for a user of the device to run a distance and provides an estimated "goal time". The estimation is based on the age and heart rate of the runner and a comparison of these data with stored the age and heart rate data in two previous runs of the same distance.

U.S. Pat. No. 5,404,341 provides an estimated time to complete one interval or lap based on a standard lap time.

U.S. Pat. No. 3,598,306 discloses a time-speed instrument that provides computation and/or display of travel time, estimated time of arrival, actual time of arrival, speed, elapsed time, distance traveled and current time. This device provides the estimated time of arrival based on user input of known variables (e.g., start time, speed to cover entire distance, and length of distance) into a manual, logarithmic clock mechanism that utilizes overlaying "cards" to calculate the various data.

In many situations, data associated with a runner's previous runs are either not available or cannot be used to predict the runner's performance in a current run. Therefore, there is a need for a timing device that computes a runner's estimated time of arrival based on his performance in part of all of the distance that the runner has covered in the current run.

SUMMARY OF THE INVENTION

The embodiments of the present invention provide a timing device that computes an estimated time of arrival (ETA) for an object in a process of traversing a predetermined range of distance based on the time the object spends to complete one or more prior intervals in the predetermined range of distance.

In one embodiment, the timing device allows a user to enter into the timing device the following: a total distance (such as a number of intervals to be covered), which can be a number of miles, kilometers or other distance measure, a number of intervals for computing the ETA, and a target goal time. The user has the option of having the ETA calculated using all previous completed intervals, which is the default setting, or having the ETA calculated based on a predetermined number of intervals.

Once these data are entered, the device is ready to provide the ETA at each interval of the distance when an ETA process is invoked. In one embodiment, the ETA process is invoked when the user presses an ETA function button on the timing device, or when the device receives an ETA signal transmitted by a transmitter located at the end of each interval. During an ETA process, the timing device computes an estimated time of arrival based on the time the objects spends in completing the number of prior intervals and produces some or all of the following data: a total elapsed time; an elapsed time of current interval, a time in which the last interval is completed, the ETA, and/or the amount that the user is ahead or behind their target goal time.

Embodiments of the invention may display such information simultaneously or in some sequential manner. The information may also or alternatively be vocalized, such as via artificial synthetic speech, so that the user does not need to look at the ETA device to obtain the information.

In certain embodiments, the invention provides a logic circuit for incorporation into a timepiece to perform the inventive ETA calculation.

DETAILED DESCRIPTION OF THE EMBODIMENTS

The embodiments of the present invention provide a timing device and methods for computing an estimated time of arrival (ETA) for an object in a process of traversing a predetermined range of distance based at least in part on the time the object spends to complete one or more prior intervals in the predetermined range of distance. Although the embodiments described below use an example of a Marathon runner, it is to be appreciated that the device and methods can be used to predict ETA for any moving object over any course, circuit, or distance. Furthermore, while the following descriptions of the embodiments sometimes illustrate the application of the timing device: as a wristwatch, the timing device and the methods performed by the timing device are not limited to watch applications.

Figure 1:
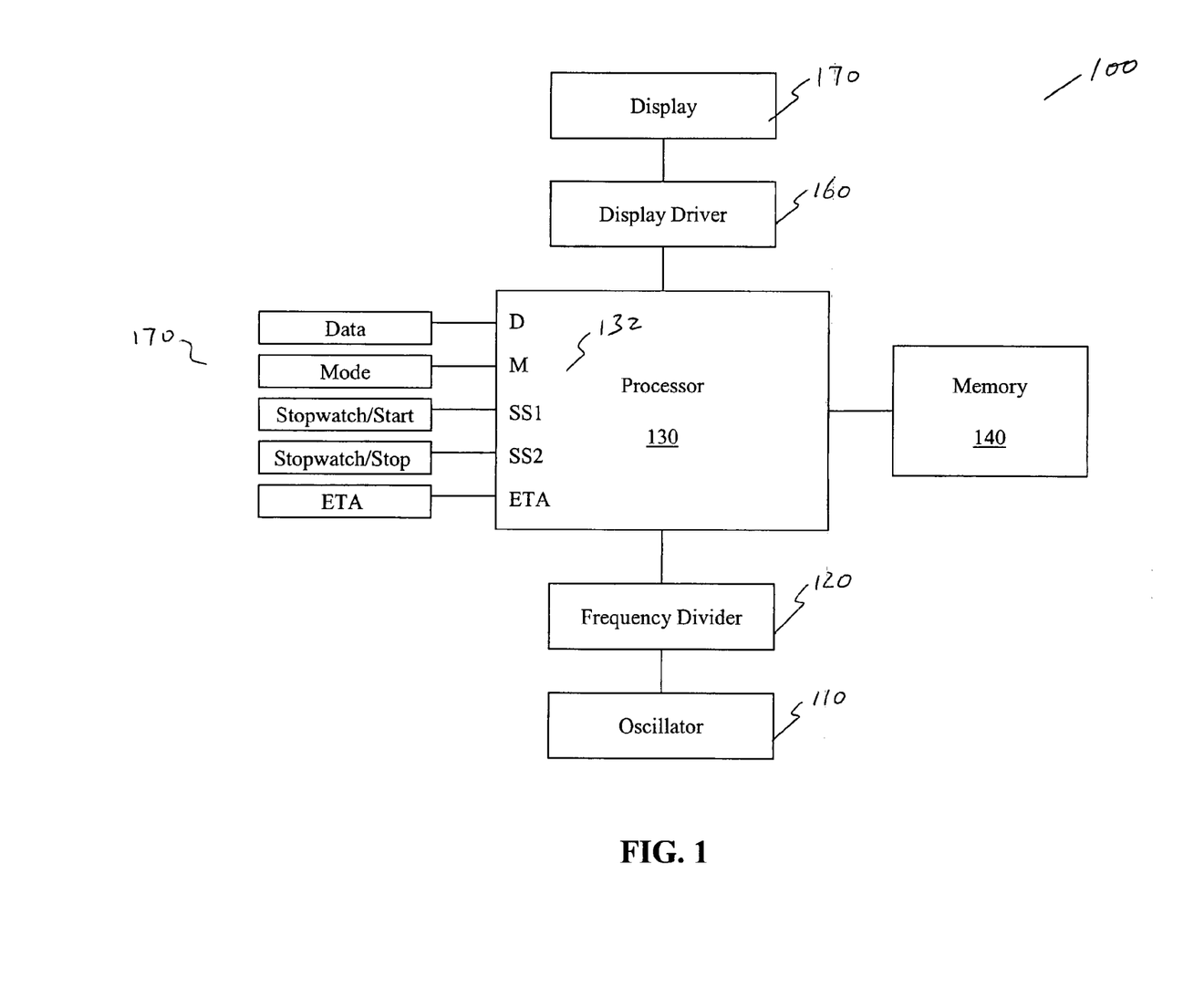
FIG. 1 is a block diagram of a timing device that computes an ETA for an object in a process of traversing a predetermined range of distance based on the time the object spends to complete one or more prior intervals in the predetermined range of distance, according to one embodiment of the present invention.

FIG. 1 is a block diagram of a timing device 100 according to one embodiment of the present invention. As shown in FIG. 1, device 100 comprises an oscillation circuit 110, a frequency divider circuit 120, control logic 130, one or more memory devices (memory) 140, a display driver circuit 150, a display device 160, and a plurality of signal input devices 170.

Oscillator circuit 110 is configured to produce periodic pulses at a stable frequency, and frequency divider circuit 120 has a chain of frequency divider stages for converting the oscillator pulses down to a convenient periodic timer reference signal having, for example, one pulse per second. The timer reference signal is provided to processor 130.

Display 150 may be visual, audio, or a combination of visual and audio displays. Thus, display 150 may comprise a screen for showing visually various time data, which are discussed below, and/or a speaker for playing audible sounds reciting the time data.

Control logic 130 comprises a plurality of input ports 112 to allow user input of data and/or instructions. In one embodiment, the plurality of input ports comprises a data input port D, a mode input port M, a stopwatch/start input port SS1, an optional stopwatch/stop input port SS2, and an ETA input port ETA. The input ports may be coupled with respective outputs of input devices 170. Control logic 130 may further comprise a processor or a logic circuit capable of performing a variety of processes including a time-keeping process, a stopwatch process, an ETA process, one or more data display processes, and the like., some or all of which are coded as program instructions stored in memory 140. For ease of discussion, control logic 130 is sometimes referred to as processor 130. Control logic 130, however, is not limited to being a processor. It can be any logic or circuitry capable of performing the processes described herein.

In one embodiment, control circuitry 130 and memory 140 may be parts of an integrated circuit (IC) chip such as a filed programmable gate array (FPGA), a programmable logic device (PLD), an application-specific integrated circuit (ASIC), or the like. Oscillator circuit 110, frequency divider 120, and/or display driver 150 may also be part of the IC chip.

Figure 2:
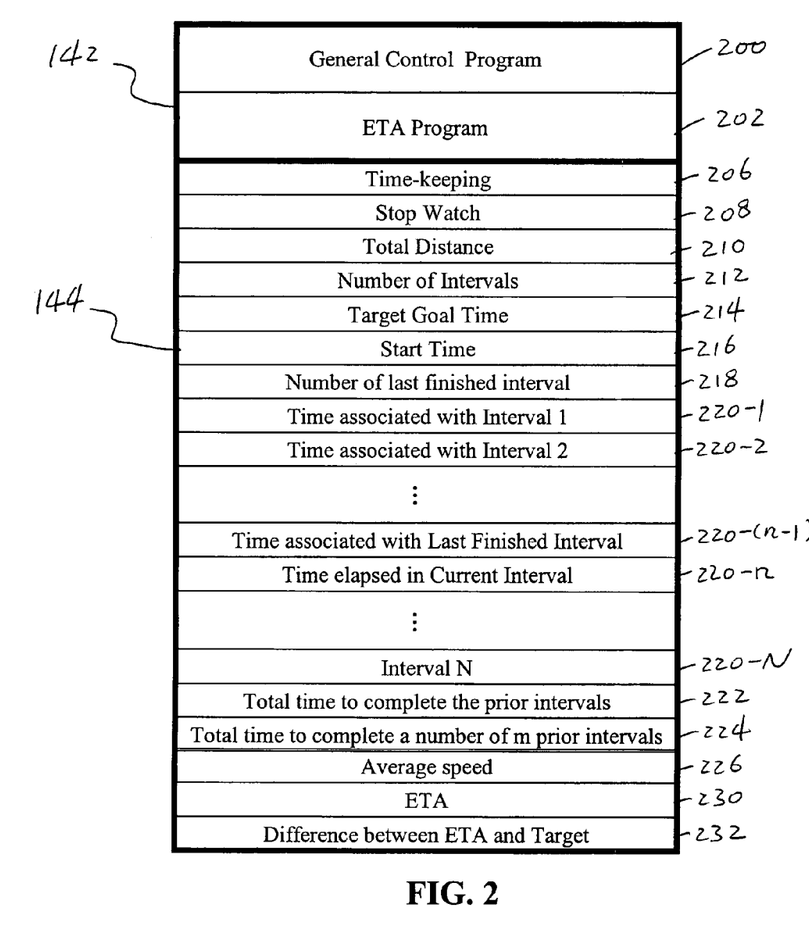
FIG. 2 is a block diagram of storage blocks in one or more memory devices according to one embodiment of the present invention.

Memory 140 also includes designated storage locations for storing user input data, default data, and computation results for display or for further computation needs. FIG. 2 is a block diagram of some of the designated storage locations in memory 140 according to one embodiment of the present invention. In one embodiment, memory 140 comprises non-volatile memory 142 and random access memory (RAM) 144. Program instructions and some default data are stored in a non-volatile read-only memory (ROM) 142, while user data, computation results, and other data are stored in designated storage locations or registers in a RAM 144.

As shown in FIG. 2, ROM 142 comprises storage locations 200 storing therein a general control program including program instructions for processor 130 to control the operation of device 100, and storage locations 202 storing therein an ETA program including program instructions for processor 130 to compute an ETA. It will also be appreciated that the methods or procedures described in the following discussions may be implemented as one or more computer programs stored in memory 140 or any other tangible computer readable medium for execution by the logic in circuitry 130.

As also shown in FIG. 2, RAM 144 comprises storage locations 206 storing therein current results of the time-keeping process such as an updated current date and time, and storage locations 208 storing therein current results of a stopwatch process such as an updated time since the stopwatch process has started. RAM 144 further comprises storage locations 210, 212, and 214 storing therein user input data for ETA calculation such as a total distance d to be traversed, a number of intervals to be used for ETA calculation, and a target goal time to reach the end of the distance, respectively. The user has the option of having the ETA calculated using all previous completed intervals, which is the default setting if the number stored in storage locations 212 is zero, or having the ETA calculated based on the number of intervals stored in storage locations 212, or according to any other preference. For example, a user may want the ETA Chip to use only the prior six intervals every time the ETA is calculated. In this example, until the first six intervals are completed, all previously completed intervals will be used in calculating the ETA. At interval seven, the timing device will begin using the last six interval times for computing the ETA.

RAM 144 further comprises storage locations 216 storing therein a start time of the stopwatch process, storage locations 218 storing therein a number corresponding to a just-completed or last-finished interval, and storage locations 220-1, 220-2, ..., 220-(n−1), 220-n, ..., 220-N, where n is the number corresponding to a current interval (i.e., the $n^{th}$ interval) and N is a number of intervals in the total distance d. Storage locations 200-1 stores therein a time (or other time related indicator) associated with the completion of the first interval, storage locations 200-2 stores therein a time associated with the completion of the second interval, ..., storage locations 200-(n−1) stores therein a time associated with the completion of the last-finished interval, and storage locations 200-n stores therein an updated time spent in the current interval. The rest of storage locations 220-1, 220-2, ..., 220-(n−1), 220-n, ..., 220-N are each designated to store a time associated with the completion of each of the rest of the intervals in the distance d.

RAM 144 further comprises storage locations 222 storing therein a total time for the completion of the intervals prior to the current $n^{th}$ interval, storage locations 224 storing therein a total time for the completion of a number m of intervals prior to the current interval 230, and storage locations 226 storing therein an average speed v computed based on the total time for the completion of the number m of intervals prior to the current interval. RAM 144 further comprises storage locations 230 storing therein a most recently calculated ETA, and storage locations 232 storing therein a most recently calculated difference between the ETA and the target goal time.

Figure 3:
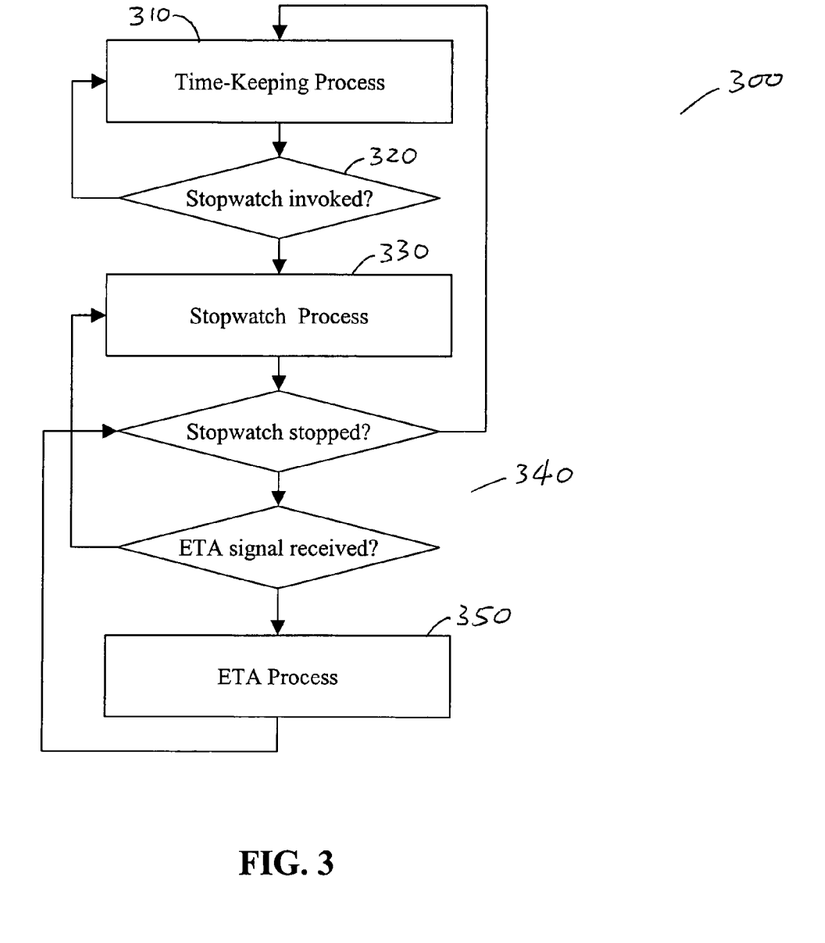
FIG. 3 is a flowchart of a process performed by a process in the timing device according to one embodiment of the present invention.

FIG. 3 is a flowchart illustrating a general control process 300 performed by processor 130 in accordance with program instructions in the general control program stored in storage locations 200, according to one embodiment of the present invention. As shown in FIG. 3, general control process 300 comprises a basic time-keeping process 310 such as one found in a conventional time-keeper. In the time-keeping process 310, the processor 130 counts the pulses in the signal from the oscillator 110 periodically (such as every second or $60^{th}$ of a second) to update the current date and time, to store the updated date and time in storage locations 206, and to cause the display driver 150 to display the updated date and time on the display 160. Process 300 further includes a step 320 in which the controller monitors the inputs 170 periodically (such as every second or $60^{th}$ of a second) for an interrupt signal. If no interrupt signal is observed, the controller continues the time-keeping process 310.

One of the user inputs that may interrupt the time-keeping process 310 or add another process to the basic time-keeping process 310 is a stopwatch/start signal sent through the SS1 input port. When such a signal is observed in step 320, process 300 proceeds to perform the stopwatch process 330 in which the controller 130 stores the time at which the stopwatch/start signal is received in storage locations 216 and clears the storage locations or registers 218, 220-1, 220-2, ..., 220-(n–1), 220-n, ... 220-N, 222, 224, 226, 230 and 232. The stopwatch process 330 then proceeds to periodically (such as, for example, every second or $60^{th}$ of a second) count the pulses in the signal from the oscillator 110 to update a total elapsed time (TET) or stopwatch time since the stopwatch is invoked. Each time the TET or stopwatch time is updated, it is stored in storage locations 208, and displayed on the display 160. During the stopwatch process 330, the current date and time may continue to be updated in storage locations 206 and shown in the display 160. The stopwatch process 330 is performed until a user input interrupts it or puts it in background. Thus, process 300 further includes a step 340 in which the controller monitors the inputs 170 periodically (such as every second or $60^{th}$ of a second) for such an interrupt signal. If no interrupt signal is observed, the controller continues the stopwatch process.

One of the user inputs that may interrupt the stopwatch process 330 is a stopwatch/stop signal sent through the SS2 input port. The stopwatch/stop signal may also be sent through the SS1 input port, as processor 130 can be configured to recognize another signal sent through the SS1 port as the stopwatch/stop signal if the stopwatch process 330 has already been started. Either way, when the stopwatch/stop signal is detected in step 340, process 300 stops the stopwatch process and resumes to the initial state of performing the basic time-keeping process 310. The last updated time in storage locations 208 may be displayed on the display 160 for a predetermined amount of time (such as 10 seconds) or until the user takes it off the display by, for example, sending another signal to the SS2 input port.

Another user input that may interrupt the stopwatch process 330 is an ETA signal sent through the ETA input port. In response to receiving the ETA signal, processor 130 proceeds to perform an ETA process 350. The ETA process 350 is performed until a user input interrupts it, stops it, or restarts it. Thus, during the ETA process 350, step 340 is performed periodically (such as every second or $60^{th}$ of a second or according to other policy or criteria) in which processor 130 monitors such an interrupt signal. If no interrupt signal is observed, the ETA process 350 continues as described below in connection with FIG. 4. During the ETA process 350, the current date and time, and/or the stopwatch time or TET may continue to be updated in storage locations 206 and 208 and be shown in the display 160.

Figure 4:
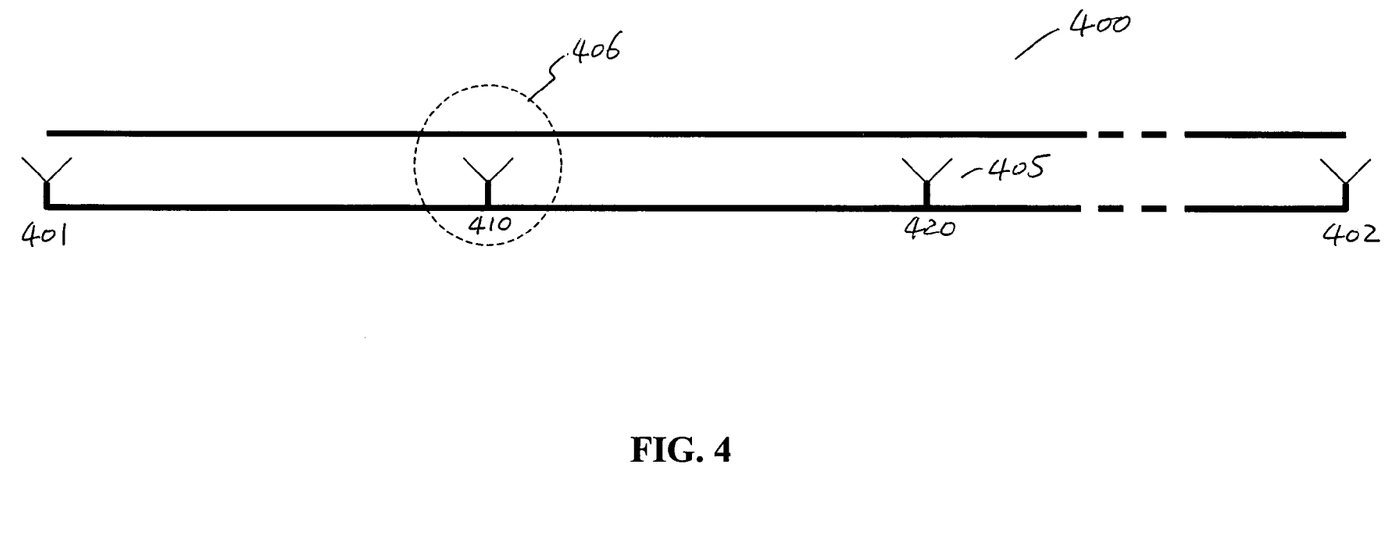
FIG. 4 is a diagram illustrating a running track or race course having transmitters for transmitting signals that automatically invoke or stop a stopwatch process and/or the ETA process in the timing device according to one embodiment of the present invention.

If a stopwatch/stop signal is received in step 340, however, the ETA process 350 and the stopwatch process 330 both stops, while the basic time-keeping process 310 resumes or continues. Alternatively, if another ETA signal is received, another ETA process is performed for a new interval. In the example that the timing device is used by a Marathon runner, the total course or distance d of a Marathon run is divided into a plurality of intervals (even or uneven), as shown in FIG. 4, which illustrates a Marathon track 400 with marker 401 marking the beginning of the run, marker 402 marking the end of the run, and markers 410, 420, etc., marking the end of the first interval, the second interval, etc., respectively. For example, a 26.5 mile run can be divided into 26 1-mile intervals plus a half mile interval at the beginning or end of the run. A stopwatch/start signal is received by processor 130 at the start of the run to start the stopwatch process 330. Subsequently at the completion of each interval, an ETA signal is received by processor 130 to start a new ETA process 350, and the stopwatch/stop signal is received by processor 130 at the end of the run to stop the stopwatch and the ETA processes.

Each stopwatch/start, stopwatch/stop, and ETA signals can be sent to the processors by the runner using the input devices 170. In one embodiment, the input devices 170 include a data input device 171 to allow the user to input data or change settings, a mode input device 173 to allow the user to change a mode of the timing-device, a stopwatch/start input device 175 to allow the input of the stopwatch/start signal, an optional stopwatch/stop input device 177 to allow the input of the stopwatch/stop signal, and an ETA input device 179 to allow the input of the ETA signal to start the ETA process and to alert the processor 130 of a just-finished interval. Input devices 171, 173, 175, 177, and 179 may be implemented using buttons, the pressing of each of which causes an electrical signal to be sent to a respective one of the input ports 132 of process 130.

Figure 5:
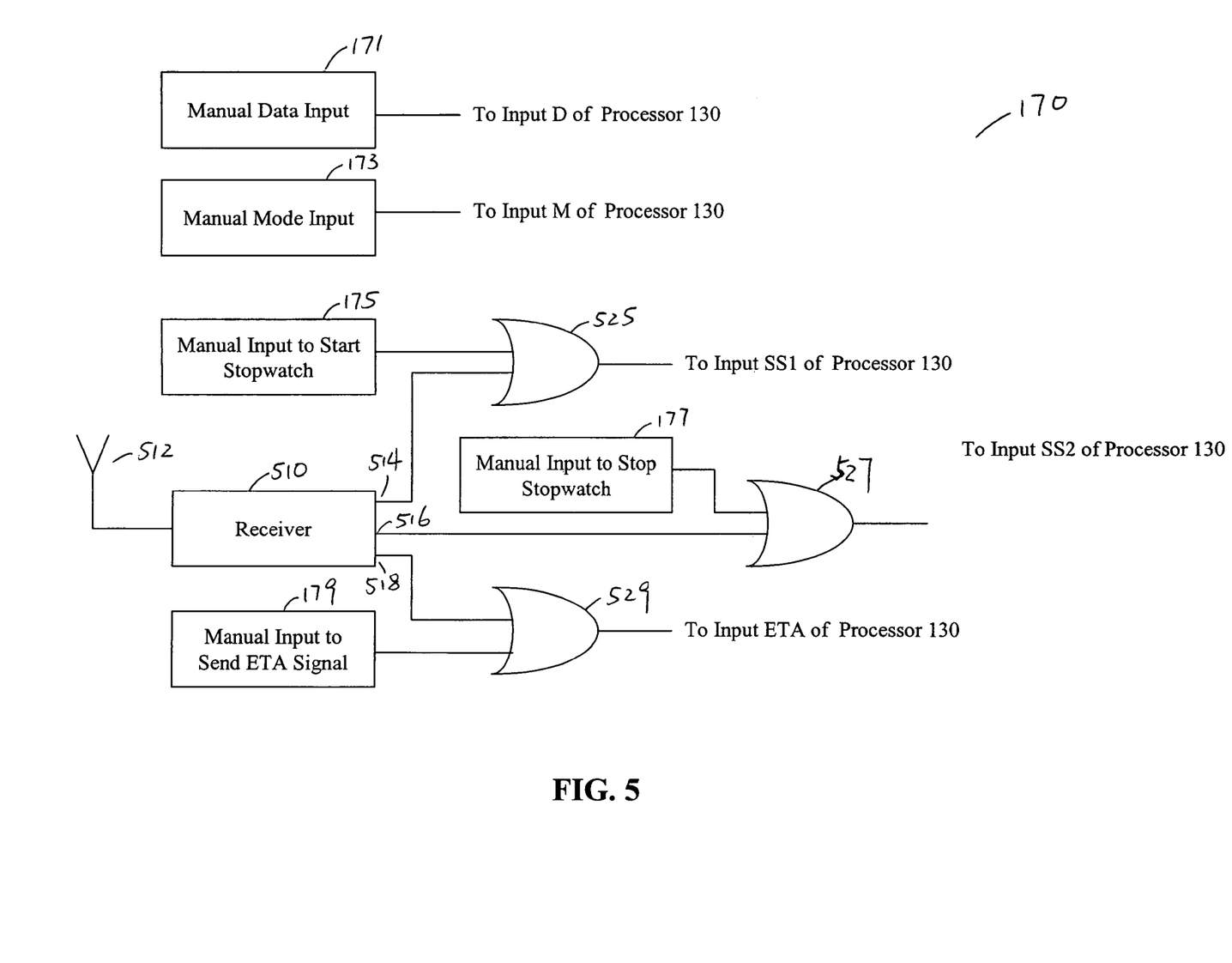
FIG. 5 is a block diagram of an input device associated with the timing device according to one embodiment of the present invention.

Alternatively or additionally, as shown in FIGS. 4 and 5, the input devices 170 may comprise an optional receiver 510 for receiving stopwatch/start, stopwatch/stop, and/or ETA signals from transmitters 405 installed at the start, finish, and end of each interval of the run, respectively. The stopwatch/start, stopwatch/stop, and/or ETA signals can be transmitted and received using conventional means. As non-limiting examples, the stopwatch/start, stopwatch/stop, and/or ETA signals can be infrared, optical, ultrasound, or radio-frequency (RF) signals. In one embodiment, transmitter 405 located at the start of the run may transmit a stopwatch start signal at the start of the run, or it may transmit a stopwatch/start signal in every $10^{th}$ of a second; each transmitter 405 located at the end of the intervals between the start and the finish of the run periodically (such as every second) transmits the ETA signals; and the transmitter 405 located at the finish of the run periodically (such as every second or $10^{th}$ of a second) transmits the stopwatch/stop signal The range of transmission 406 of each transmitter is set to be big enough to cover at least a width of track 400 at the location of the transmitter but should be too big to cause interference with other transmitters. In one embodiment, the range of transmission is about a $10^{th}$ of an interval.

In one embodiment, receiver 510 comprises an antenna 512 configured to receive the stopwatch/start, stopwatch/stop, and/or ETA signals, and circuitry (not shown) for decoding a received signal in order to determine whether the signal is a stopwatch/start, stopwatch/stop, or ETA signal. If the signal is a stopwatch/start signal, the circuitry sends it to an output terminal 514 coupled to input port SS1 of processor 130. If the signal is a stopwatch/stop signal, the circuitry sends it to an output terminal 516 coupled to input port SS2 of processor 130. If the signal is an ETA signal, the circuitry sends it to an output terminal 518 coupled to input port ETA of processor 130. Again, the provision of input port SS2 and the differentiation of the stopwatch/start and stopwatch/stop signals are optional. A same type of signal as the stopwatch/start signal may be treated as the stopwatch/stop signal by the process 130 if the stopwatch process 330 has started.

The receiver 510 may be provided in addition to manual input devices 175, 177, and 179 so the user can choose whichever way to input the stopwatch/start, stopwatch/stop, and ETA signals. As shown in FIG. 5, input devices 170 further comprise logic blocks 525, 527, and 529 each implementing a logic OR function. Manual input device 175 and output 514 of receiver 510 are coupled to inputs of logic block 525 whose output is coupled to input SS1 of processor 130. So, either the manual input at the manual input device 175 or a stopwatch/start signal from output 514 is processed by processor 130 to start the stopwatch process 330. Manual input device 177 and output 516 of receiver 510 are coupled to inputs of logic block 527 whose output is coupled to input SS2 of processor 130. So, either the manual input at the manual input device 177 or a stopwatch/start signal from output 516 is processed by processor 130 to stop the stopwatch process 330. Furthermore, manual input device 179 and output 518 of receiver 510 are coupled to inputs of logic block 529 whose output is coupled to input ETA of processor 130. So, either the manual input at the manual input device 179 or an ETA signal from output 518 is processed by processor 130 to start each ETA process 350.

In one embodiment, processor 130 is configured to ignore a stopwatch/start, stopwatch/stop, or ETA signal that is received within a predetermined time after the reception of a previous stopwatch/start, stopwatch/stop, and/or ETA signal. The predetermined time may be set to be equal to the time required to complete a $10^{th}$ of an interval using the average speed of a holder of a current world record on a similar Marathon run. When two consecutive stopwatch/start, stopwatch/stop, or ETA signals are received by receiver 510 near a single marker 401, 402, 410, 420, etc., the one later in time is ignored by processor 130. Also, if the user gives a manual input of ETA signal at the end of an interval wherein a transmitter 405 is also installed, the earlier input of the ETA signal, whether it comes from the user or the transmitter is processed by processor 130 while the one received later in time is ignored.

Figure 6:
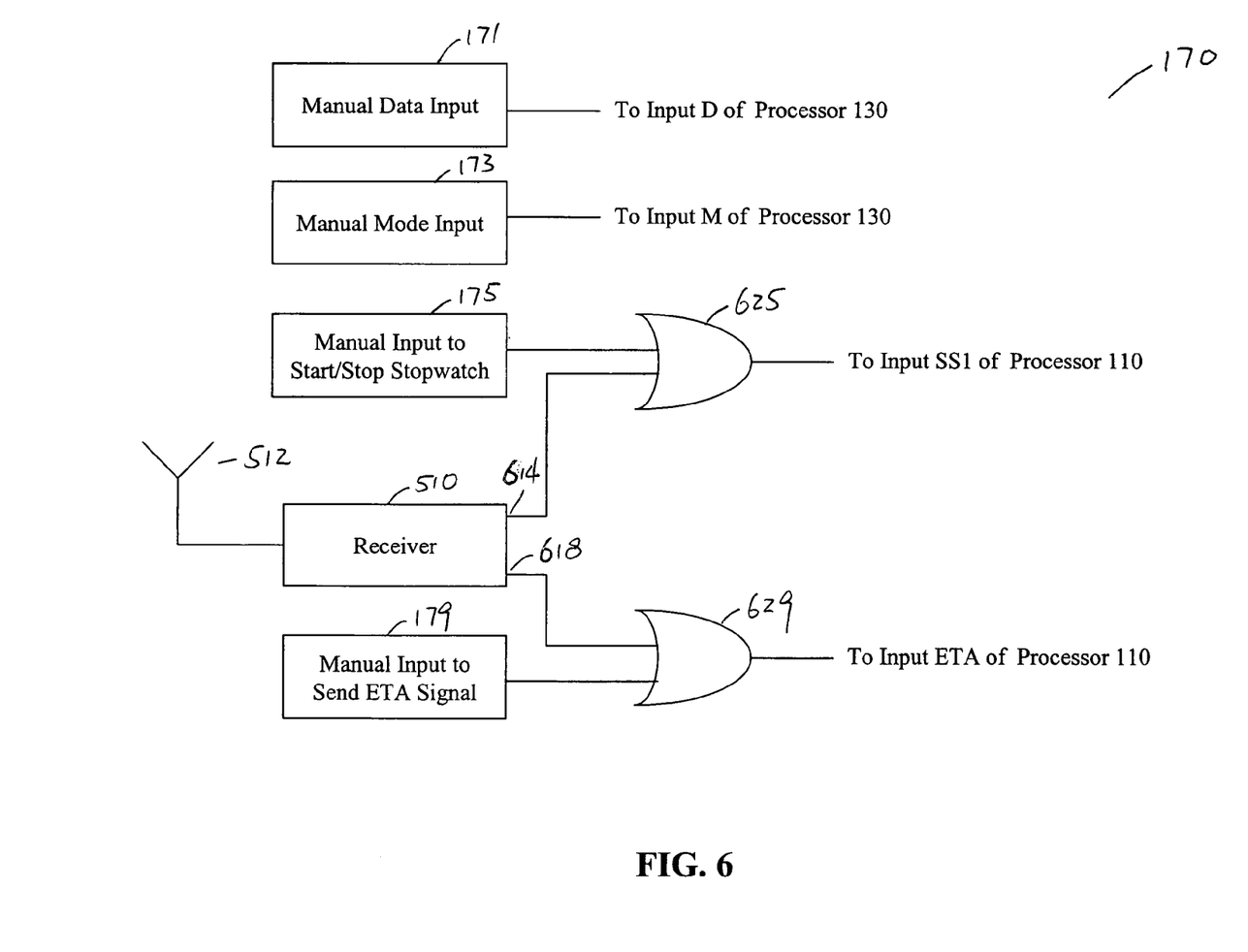
FIG. 6 is a block diagram of an input device associated with the timing device according to an alternative embodiment of the present invention.

FIG. 6 illustrates an alternative implementation of input devices 170 when input SS2 is not provided. As shown in FIG. 6, input devices 170 comprise receiver 510 having two outputs 614 and 618, and logic blocks 625 and 629 each implementing a logic OR function. Manual input device 175 and output 614 of receiver 510 are coupled to inputs of logic block 625 whose output is coupled to input SS1 of processor 130. So, either the manual input at the manual input device 175 or a stopwatch/start or stopwatch/stop signal from output 514 is processed by processor 130 to start or stop the stopwatch process 330. Furthermore, manual input device 179 and output 618 of receiver 510 are coupled to inputs of logic block 629 whose output is coupled to input ETA of processor 130. So, either the manual input at the manual input device 179 or an ETA signal from output 618 is processed by processor 130 to start each ETA process 350.

Figure 7:
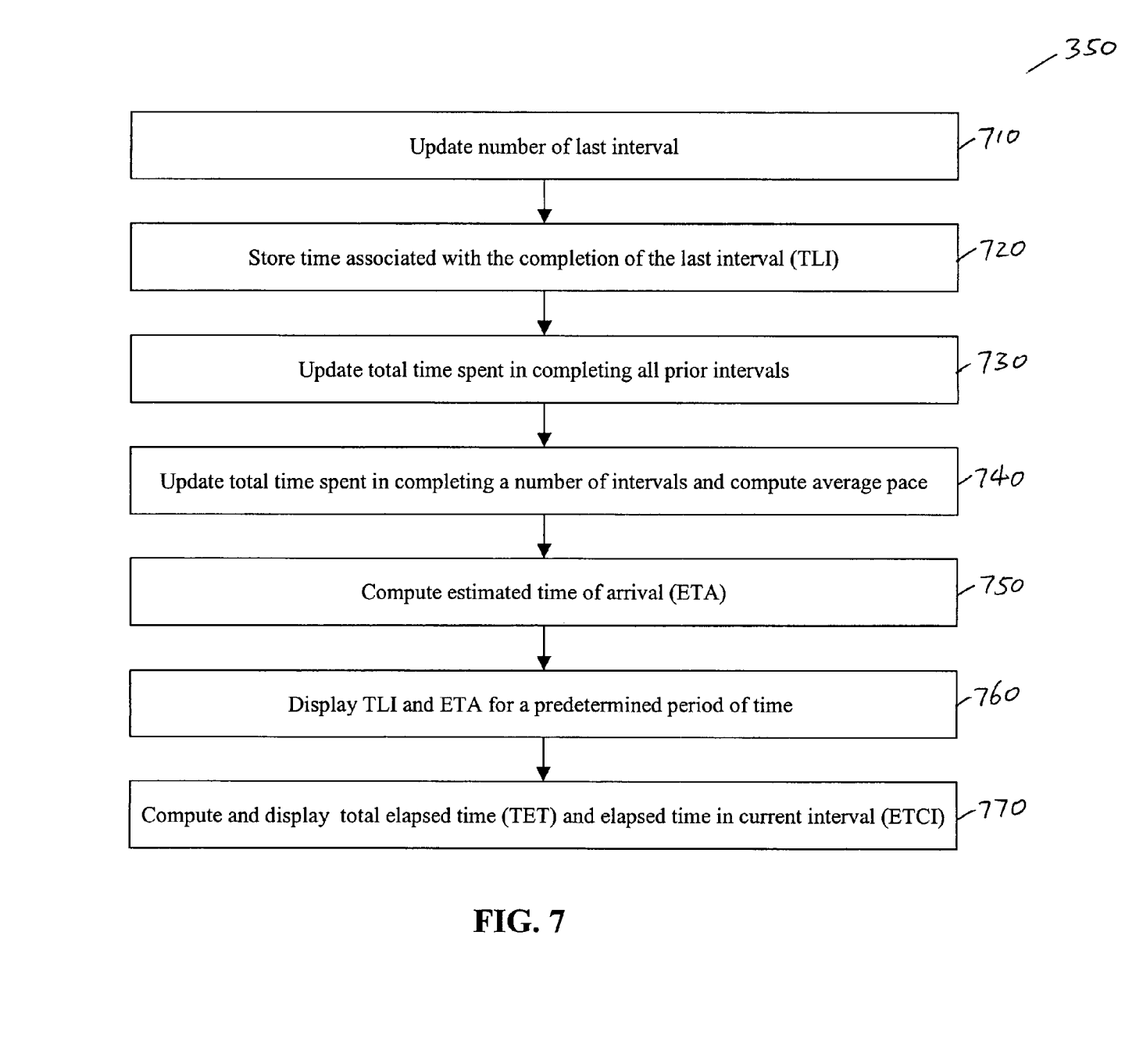
FIG. 7 is an ETA process according to one embodiment of the present invention.

FIG. 7 is a flowchart illustrating the ETA process 350 performed by processor 130 in accordance with program instructions stored in storage locations 202, according to one embodiment of the present invention. As shown in FIG. 7, ETA process 350 comprises a step 710 in which the number corresponding to the last-finished interval is updated and stored in storage locations 218. For example, if the last-finished interval is the fifth interval in the total distance d, the number 5 is stored in storage locations 218. ETA process 350 comprises a step 720 in which the time associated with the completion of the last-finished interval (TLI) is updated and stored in storage locations 220-($n$–1). Since the ETA process 350 is restarted at the completion of each interval (except the final interval at the end of the total distance d), by the time the runner enters the nth interval, storage locations 200-1, 200-2, . . . , and 200-($n$–1) should store the time associated with the completion of the first, second, and $(n-1)^{th}$ intervals, respectively. The time associated with the completion of an interval can be the time or stopwatch time at which the interval is completed by the runner, or the time the runner spent in completing the interval (i.e., the time from the start to the completion of the interval), or both. In one embodiment, the time $t_i$ the runner spent in completing the interval i is stored as the time associated with the completion of the interval i, where i=1, 2, . . . , N.

Still referring to FIG. 7, ETA process 350 further comprises step 730 in which the processor 130 updates the total time $T_{n-1}$ spent by the runner in completing the intervals prior to the current interval (e.g., the $n^{th}$ interval). This can be done by summing up $t_i$, where i=1, . . . n–1, or simply by adding $t_{(n-1)}$ to $T_{n-2}$, which is stored in storage locations 222. ETA process 350 further comprises step 740 in which the processor 130 updates the total time $\tau_n$ spent by the runner in completing a number m of intervals prior to the current $n^{th}$ interval, and computes the average pace π, which is the average time the runner spent in completing each of the m prior intervals. In one embodiment, the number m of prior intervals is specified by a user of the timing device, such as the runner himself or herself, and is stored in storage locations 212. If the runner did not enter such a number before the run, a number previously stored in storage locations 212 or a default number will be used as the number m. The time $\tau_n$ can be computed by summing up $t_i$, i=n–m, . . . n–1, or simply by adding $t_{(n-1)}$ to $\tau_{n-1}$, which is stored in storage locations 224. With $\tau_n$ computed, the average pace 7 can be computed by dividing $\tau_n$ by the number m. The updated $\tau_n$ and average pace π are stored in storage locations 224 and 226, respectively.

ETA process 750 further comprises step 750 in which an ETA is computed. In one embodiment, the ETA is computed by adding the product of the average pace π and the number of intervals remaining to be covered (including the current interval) to the total time $T_{n-1}$, which is the time the runner has spent in completing the intervals prior to the current interval. Step 350 can be performed according to the equation:

$$ETA = T_{n-1} + (N-n+1) \times \pi,$$

The newly computed ETA is stored in storage locations 230. ETA process 350 may also compute in step 750 a difference between the newly computed ETA and the user specified target goal time and stores the newly computed difference value in storage locations 232.

ETA process 350 further comprises step 760 in which ETA results including the ETA and optionally the TLI and/or the difference between the newly computed ETA and the user specified target goal time are displayed for a predetermined period of time or until a new ETA signal is received at the end of the current interval. When the ETA results are not displayed, the stopwatch time or TET and/or the current date and time are displayed during the run. ETA process 350 further comprises step 770 in which the ETA process 350 proceeds to periodically (such as every second or $60^{th}$ of a second) count the pulses in the signal from the oscillator 110 to update an elapsed time in the current interval (ETCI) since the ETA process 350 has started. Each time the ETCI is updated, it is stored in storage locations 220-$n$, and may be displayed on the display 160.

Figure 8:
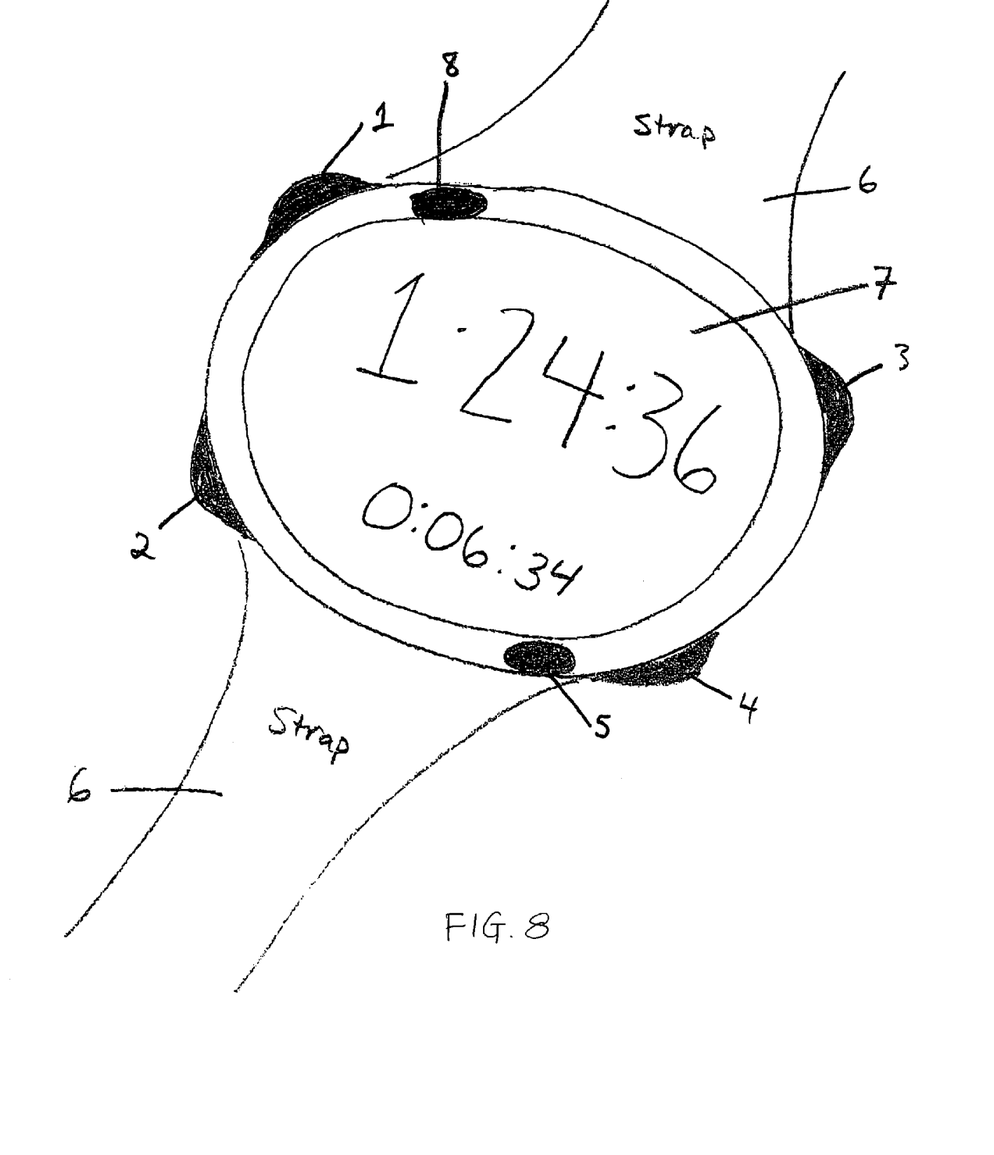
FIG. 8 is a diagram of a running watch as the timing device according to one embodiment of the present invention.

FIG. 8 illustrates a wristwatch or other wearable timepiece 800 comprising the timing device according to one embodiment of the present invention. As shown in FIG. 8, watch 800 comprises a plurality of buttons as input devices 170, including an Adjust/Reset button (1), a Mode button (2), a Start/Lap button (3), a Stop/Next button (4), and an ETA button (5). Watch 800 further comprises a Strap (6), a Watch Faceplate (7), and a Night Light (8).

The Adjust/Reset button (1) corresponds to input device 171 and is used to adjust the time, alarm time, the number of intervals to be used in the ETA calculation, the number of intervals in the distance to be covered, the goal completion time and the time for the timer countdown. After data is entered or adjusted, the Adjust/Reset button is depressed again to lock in the revised data. This button also resets the data when the watch 800 is in the following modes: chronometer, data and counter.

In one embodiment, the Mode button (2) selects one of the following modes: goal time, number of total intervals, number of intervals for ETA calculation, time, chronometer, data, timer, counter and alarm. Each time this button is depressed, it moves the watch into its next mode to allow the input of the respective data. In one embodiment, the list of modes is arbitrary but sequential, meaning the modes cannot be "skipped" when scrolling through the functions by depressing this button. In other embodiments, the mode selection interface may be configured differently to suit the need of the user.

The Start/Lap button (3) performs the following functions: in the time mode, it selects whether an audible "chirp" is heard when any of the other buttons are depressed. In the chronometer mode, it starts this timing feature. Also, when depressed while in the course of travel, it displays the time of the last lap or "split." For example, it may display the time since this button was last depressed. Typically, this button is depressed at each interval to show the time to complete each interval or "split." In the data mode, this button plays back the split time for each interval from each run. (After each run, the data may be stored in the watch including all splits.) In the timer or stopwatch mode, this button initiates the timer or stopwatch process 330 to start. In the counter mode, depressing this button adds one to the total count. In the alarm mode, this button selects whether each of one or a plurality of alarms is on or off. In the adjust mode, this button adjusts the hour and minute in the time mode (the user moves from the hour to minute adjustment by depressing the Start/Next button while in the adjust mode). Using this button, the user can also input the time for the alarms, input the number of intervals, the goal time, and the number of intervals to be used when calculating the ETA.

In the illustrative embodiment, the Stop/Next button (4) performs the following functions: in the time mode, it selects whether the watch is in time zone 1 or in time zone 2 (the watch has two time settings to allow it to display the time in two separate time zones). In the chronometer mode, when turned on, this button stops the chronometer. If the chronometer is not on, depressing this button displays the total amount of "splits" that are available in the watch's memory. Similarly, it also stops the timer. In the timer mode or stopwatch process 330, pressing this button sends the stopwatch/stop signal. In the data mode, it chooses which run data (stored in the watch) is to be displayed. In the counter mode, it counts in a negative direction (0, −1, −2, etc) when depressed. In the alarm mode, it chooses which of seven alarms are displayed and it also allows the user, when adjusting the alarm, time and the goal time, to move from hours to minutes The ETA Button (5) has the following functions: when depressed when the user completes an interval it starts a new ETA process 350 for the new interval and shows the estimated time of arrival in large numbers and, below the ETA in smaller numerals, it shows how far ahead or behind the user is from their predetermined goal time. Also, the user will have the option of having the ETA calculated based on taking an average time for all previous intervals (which is the default when depressing the ETA button) as well as, when depressing the Adjust/Reset button after depressing the ETA button, showing the ETA based on the predetermined number of intervals.

Although the watch 800 is described and depicted as having "buttons", it is to be understood that any variety of input mechanisms may be used to perform the above functionality. By way of example but not limitation, the device may be set or programmed via a computer interface, using voice command or any other input means or devices.

After the user depresses the ETA button (and, if utilized, the Adjust/Reset button) the watch display will show the ETA for four seconds and then the display will revert back to displaying the total elapsed time and the current time (or "split") spend in the interval through which the user is currently traveling.

From the foregoing it will be appreciated that, although specific embodiments of the invention have been described herein for purposes of illustration, various modifications may be made without deviating from the spirit and scope of the invention. For example, although described above as an ETA "Chip" it is to be understood that any number of semiconductor devices or chips may be used to implement the above functionality, as well as any combination of hardware, software, and/or firmware. Accordingly, the invention is not limited, including by the appended claims.

I claim:

1. A method for computing an estimated time of arrival of an object in a process of traveling a predetermined range of distance that is divided into a plurality of intervals each having an identical length, the method comprising:
   a. receiving an input by the user designating the number of intervals dividing said predetermined range of distance to be traveled;
   b. receiving an input by the user designating the number of immediately prior intervals traveled;
   c. receiving an input by the user designating a target goal time to complete travel of the designated number of intervals;
   d. calculating an average pace of the object at the completion of each interval; and
   e. calculating said estimated time of arrival based on said average pace of said designated number of immediately prior intervals traveled at the completion of each interval.

2. A method according to claim 1,
   wherein calculating said average pace of the object comprises dividing a total time to travel said designated number of immediately prior intervals traveled by said designated number of immediately prior intervals; and
   wherein calculating said estimated time of arrival comprises multiplying said average pace of the object by a remaining number of uncompleted intervals.

3. A method according to claim 1,
   wherein if a total number of completed intervals is less than said designated number of immediately prior intervals, said total time to travel equals a total time the object has spent completing all previously completed intervals.

4. A method according to claim 1, further comprising computing a difference between said estimated time of arrival and the target goal time and displaying said difference.

5. A method according to claim 1, further comprising displaying said estimated time of arrival on a screen or reciting said estimated time of arrival using audio sound.

6. A device for computing an estimated time of arrival for an object in a process of traversing a predetermined range of distance, the distance being divided into a plurality of intervals each having an identical length, comprising:
   a first input indicating a completion of a just-completed interval by the object of said plurality of intervals;
   a second input indicating a selected number of completed intervals;

logic coupled to the inputs and configured compute said estimated time of arrival of said object based on said object's average pace per interval for said selected number of completed intervals immediately preceding said object's current interval and a number of the plurality of intervals not yet completed; and a display operable to display said estimated time of arrival.

7. A device according to claim 6, wherein the device is implemented in a wristwatch, a wearable tag, or computer chip.

8. A device according to claim 6, wherein said logic comprises a logic circuit or a processor or a combination thereof.

9. A device according to claim 6, wherein said display comprises a screen or a speaker or a combination thereof.

10. A device according to claim 9, further comprising a memory storing therein computer program instructions that when executed by the processor causes the processor to perform a process to compute said estimated time or arrival.

11. A device according to claim 6, wherein said object comprises a person.

12. The device according to claim 6, wherein said first input is a button pressable by a user upon completing said just-completed interval.

13. The device according to claim 6, wherein said first input comprises a manual button.

14. A method for computing an estimated time of arrival of an object in a process of traversing a predetermined range of distance that is divided into a plurality of intervals each having a predefined and identical length, the method comprising:

receiving an input indicating a designated number of intervals to calculate an average pace per interval at a completion of each interval;

calculating said estimated time of arrival based on said average pace per interval for said designated number of intervals immediately prior to a current interval and a remaining number of uncompleted intervals;

wherein said estimated time of arrival is computed and displayed at a completion of each interval.

* * * * *